(12) United States Patent
Nason et al.

(10) Patent No.: US 8,446,898 B2
(45) Date of Patent: May 21, 2013

(54) METHOD FOR DISTRIBUTING CONNECTION ATTEMPTS TO A SERVER

(75) Inventors: Christopher James Nason, Kanata (CA); Robert Star, Kanata (CA)

(73) Assignee: Mitel Networks Corporation, Otawa, Ontario (CA)

( * ) Notice: Subject to any disclaimer, the term of this patent is extended or adjusted under 35 U.S.C. 154(b) by 1655 days.

(21) Appl. No.: 11/682,932

(22) Filed: Mar. 7, 2007

(65) Prior Publication Data

US 2007/0211707 A1 Sep. 13, 2007

(30) Foreign Application Priority Data

Mar. 10, 2006 (EP) ..................................... 06251290

(51) Int. Cl.
*H04L 12/66* (2006.01)
*H04B 7/204* (2006.01)
*H04B 7/212* (2006.01)
*H04W 4/00* (2009.01)
*H04J 3/00* (2006.01)

(52) U.S. Cl.
USPC ........... 370/352; 370/319; 370/334; 370/337; 370/347

(58) Field of Classification Search
None
See application file for complete search history.

(56) References Cited

U.S. PATENT DOCUMENTS

| 7,451,340 B2* | 11/2008 | Doshi et al. .................. 714/47.2 |
| 2003/0099197 A1 | 5/2003 | Yokota et al. |
| 2004/0105445 A1 | 6/2004 | Wyn-Harris et al. |
| 2004/0208186 A1* | 10/2004 | Eichen et al. .................. 370/401 |
| 2005/0091388 A1* | 4/2005 | Kamboh et al. ............... 709/228 |
| 2005/0195741 A1* | 9/2005 | Doshi et al. .................. 370/230 |
| 2005/0198311 A1 | 9/2005 | Smith et al. |
| 2006/0168240 A1* | 7/2006 | Olshefski ...................... 709/227 |

OTHER PUBLICATIONS

Alexander, Pierce, Smith, Whetten: "Cisco CallManager Fundamentals: A Cisco AVVID Solution", Jul. 31, 2001, Cisco Press, XP002394266.
European Search Report.

* cited by examiner

*Primary Examiner* — Faruk Hamza
*Assistant Examiner* — Thinh Tran

(57) ABSTRACT

A client/server network includes a plurality of IP devices in communication with a central server and one another. Each of the plurality of IP devices maintains a count of the number of the IP devices attempting to connect to the central server at one time in order to monitor the load on the central server. Wherein each of the plurality of IP devices verifies that the count does not exceed a maximum count prior to attempting connection to the central server.

12 Claims, 5 Drawing Sheets

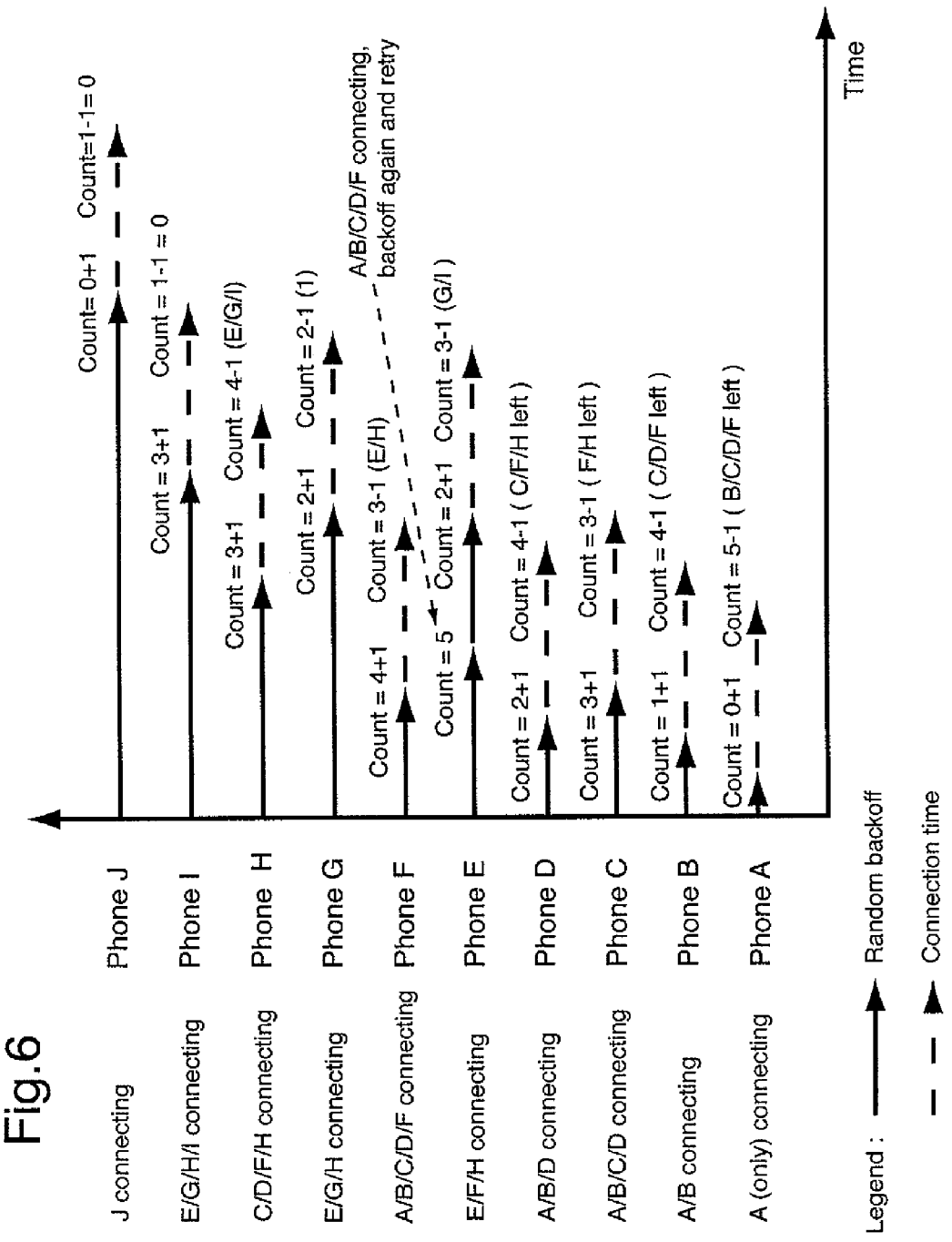

METHOD FOR DISTRIBUTING CONNECTION ATTEMPTS TO A SERVER

FIELD OF THE INVENTION

The present invention relates to a method for distributing connection attempts to a server, in particular, connection attempts of a stimulus IP phone to a PBX.

BACKGROUND OF THE INVENTION

In a typical client/server voice communication network, multiple IP phones communicate with a PBX using Transmission Control Protocol (TCP) connections. The IP phones connect to the PBX using a 3-stage process. The process generally includes acquiring a TCP link to the PBX usually requiring a three-way handshake, making a secure connection and creating a control link with the PBX (ie. registration). IP phones that rely on stimulus messaging generally require a persistent TCP control link to their PBX.

During certain events, such as recovery from a power failure, for example, the PBX may become flooded when a large number of IP phones attempt to establish connections at the same time. The large number of SYN packets in the queue along with other messages results in the requesting IP phones waiting a long time prior to establishing a connection with the PBX.

PBX connection delays for all IP phones are exacerbated by the addition of security protocols, such as Secure Sockets Layer (SSL). Processing SSL connections is time-consuming due to the large number of computations required in creating keys, which have the highest level of security, as required by IP phones. As such, the PBX generally limits the number of IP phones able to simultaneously attempt SSL connections and refuses further SSL attempts once the quota for the PBX has been reached. It is common in such circumstances for IP phones to be turned away, forced to disconnect their TCP connection and attempt a 3-way handshake on a non-secure cleartext port of the PBX.

Once an IP phone connects to a secure or non-secure port, it registers with the PBX and provides its device capabilities in the registration request. If the IP phone is on an unsecure port yet advertises that it supports SSL, the PBX may reject the registration request and force the IP phone to disconnect in order to retry the SSL connection. If the PBX accepts the registration, it will send the IP phone a large number of stimulus commands to configure the IP phone to be able to make and accepts phone calls. The large internal messaging flows associated with the configuration for large bursts of IP phones may result in significant degradation of PBX performance.

Allowing a large number of IP phones to connect to the PBX in a random manner is an inefficient and lengthy process. One solution is to optimize the number of TCP SYN packets that each phone sends out. Limiting the amount of time that the IP phones attempt to connect to the PBX to, say 10 seconds, concentrates the transmission of SYN packets to a short period. If the phones are allowed to attempt to connect for longer periods, the SYN packets will be spaced out with long delays due to the random backoff scheme that TCP employs.

The trend in the telecommunications industry is to provide client/server networks that are able to support more and more phones per PBX. As such, the total time required to connect all of the IP phones continues to grow. It is desirable to minimize the amount of time required for each IP phone to establish a connection with the PBX and therefore minimize the total connection time.

SUMMARY OF THE INVENTION

In one aspect of the present invention there is provided a method for a plurality of IP devices in communication with a central server to connect to the central server. The method includes: one of the plurality of IP devices attempting to connect to the central server when the number of the IP devices attempting to connect to the central server is less than a maximum number, wherein the one of the plurality of IP devices broadcasts a first message to others of the plurality of IP devices upon starting to attempt connection to the central server and broadcasts a second message to the others when finished attempting connection to the central server. Each of the IP devices increments the number of the IP devices upon receipt of the first message and decrements the number of the IP devices upon receipt of the second message.

In another aspect of the present invention there is provided a client/server network comprising a plurality of IP devices in communication with a central server and one another, each of the plurality of IP devices broadcasting a first message to others of the plurality of IP devices upon starting to attempt to connection to the central server, broadcasting a second message to the others of the plurality of IP devices when finished attempting connection to the central server, and maintaining a count of a number of the IP devices attempting to connect to the central server at one time, wherein each of the plurality of IP devices verifies that the count does not exceed a maximum count prior to attempting connection to the central server.

BRIEF DESCRIPTION OF THE DRAWINGS

The invention will be better understood with reference to the following Figures in which like numerals denote like parts and in which:

FIG. 6 is a timing diagram showing an example of a plurality of IP phones attempting connections to a PBX, according to the present invention.

DETAILED DESCRIPTION OF THE PREFERRED EMBODIMENTS

Figure 1:
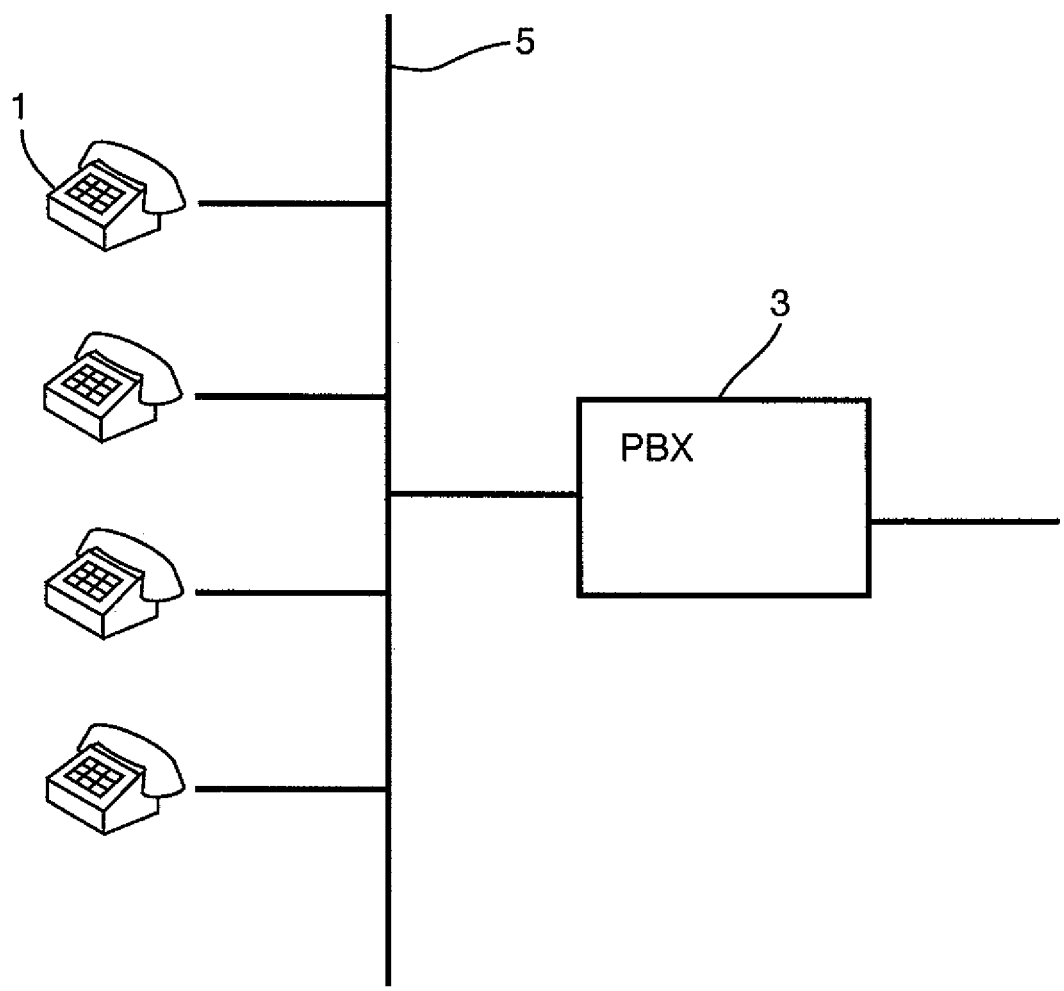
FIG. 1 is a schematic view of a prior art IP phone subnet.

In an embodiment of the present invention, a subnet 5 of stimulus IP phones 1 communicate with a central server 3, or PBX, to provide a client/server network, as shown in FIG. 1. The IP phones 1 further communicate with one another in order to control the number of IP phones 1 attempting to connect to the PBX 3 at one time. Four IP phones 1 are shown in FIG. 1, however, the subnet 5 may include any number of IP phones 1.

Figure 2:
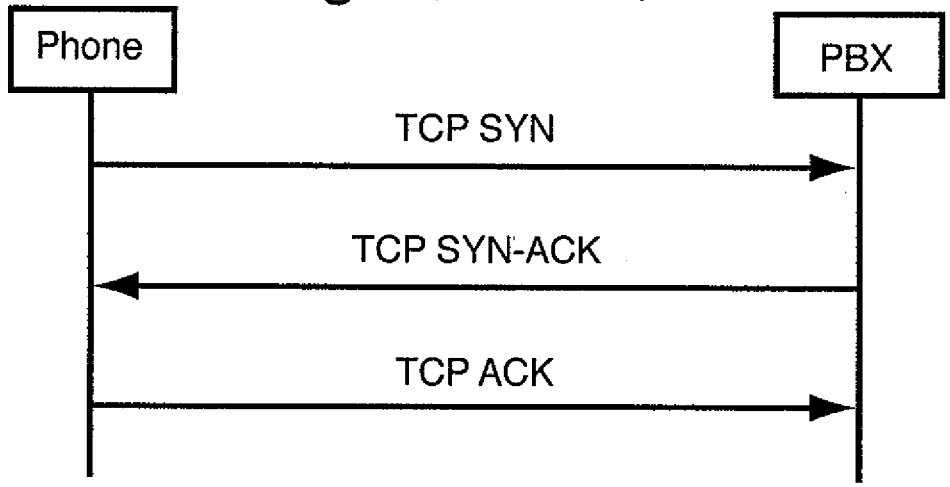
FIG. 2 is a schematic diagram showing an IP phone acquiring a TCP link to a PBX, as known in the prior art.
Figure 3:
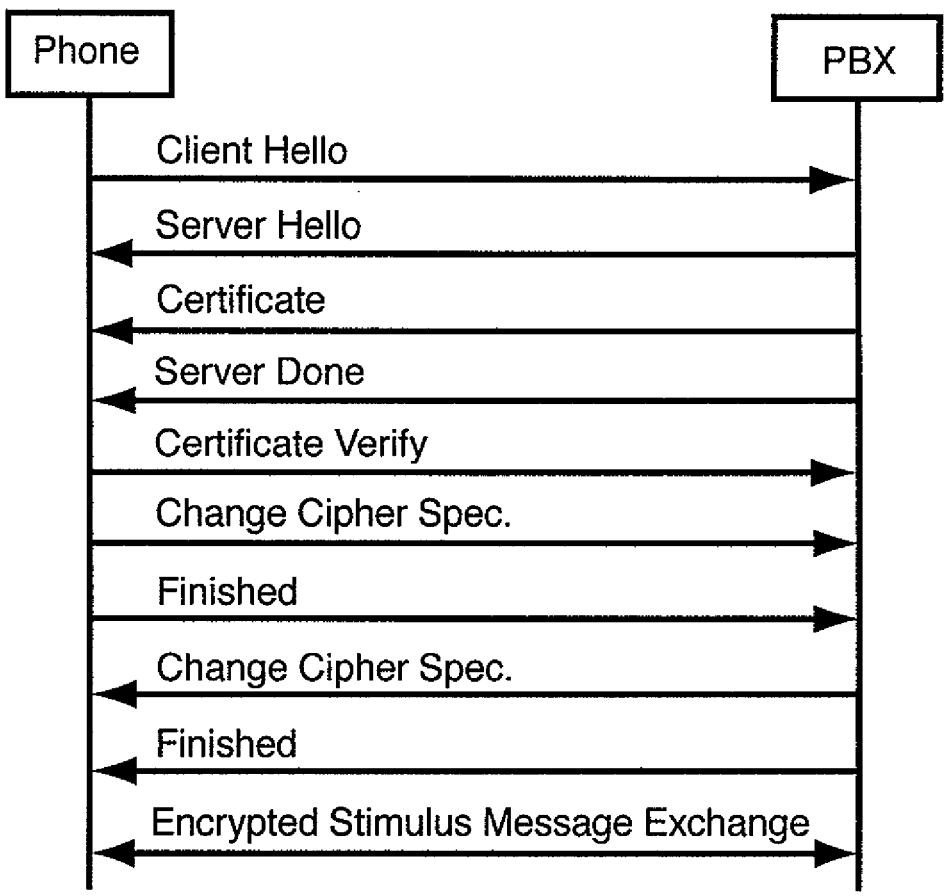
FIG. 3 is a schematic diagram showing an IP phone making a secure connection with a PBX, as known in the prior art.
Figure 4:
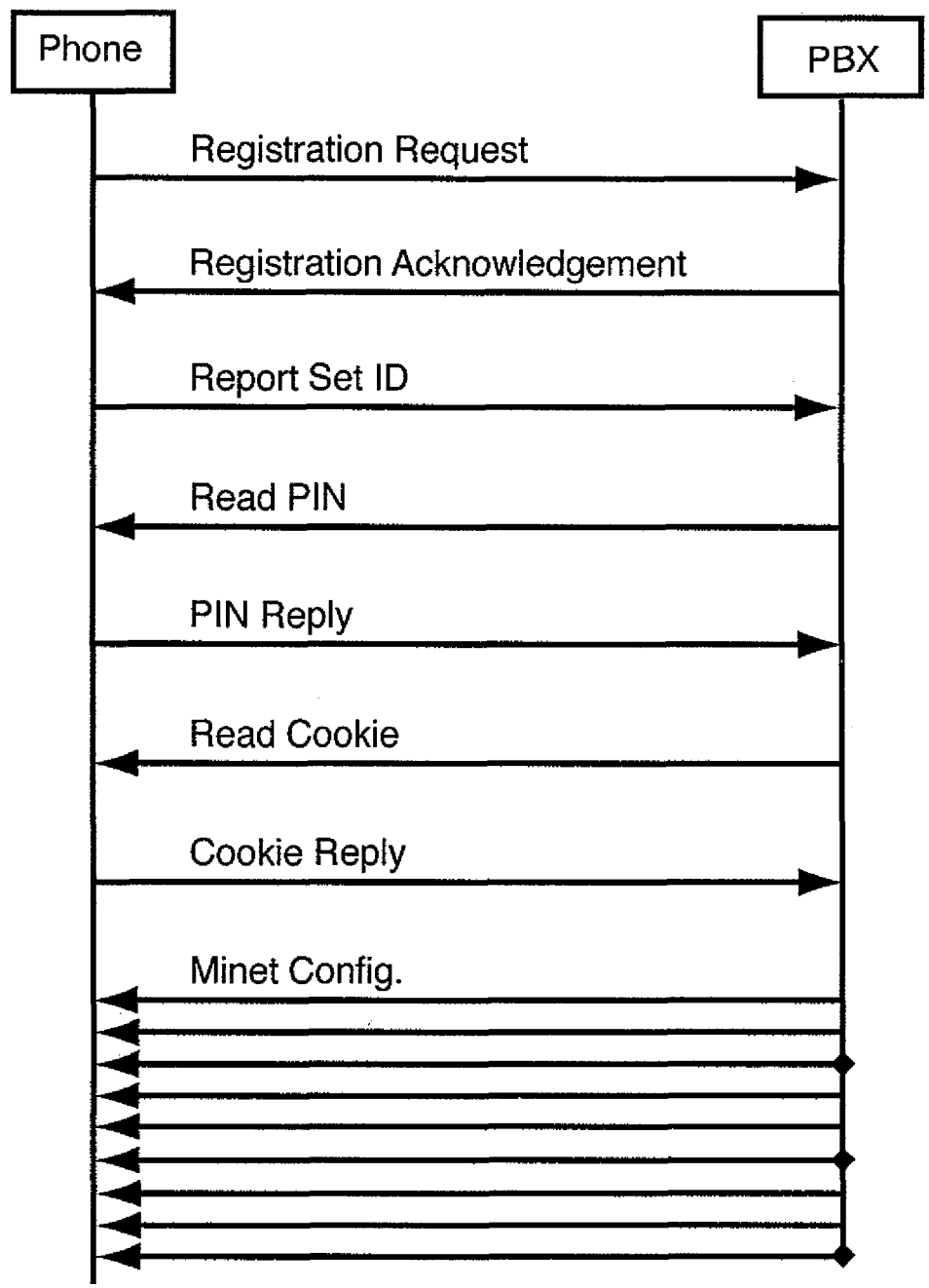
FIG. 4 is a schematic diagram showing an IP phone creating a control link with a PBX, as known in the prior art.

IP phone-PBX registration includes three stages: (i) acquiring a TCP link to the PBX 3, which is generally shown in FIG. 2, (ii) making a secure connection, which is generally shown in FIG. 3, and (iii) creating a control link or registering with the PBX 3, which is generally shown in FIG. 4. Each stage involves the IP phone attempting a different type of connection with the PBX. The stages are performed in order and successful connection must be achieved at each stage prior to continuing on to the next stage. IP phones attempting connections in each of the three stages are considered to be in one of three groups: Group 1: TCP connections; Group 2: Secure Sockets Layer (SSL) connections; and Group 3: Registration requests, as set forth in FIGS. 2, 3 and 4, respectively.

Upon power up, IP phones 1 receive their configuration information from Dynamic Host Configuration Protocol (DHCP), manual configuration or from a configuration file. According to the present invention, configuration information includes a maximum phone count for each of the three groups indicated above. More specifically, the configuration information includes the maximum number of IP phones 1 attempting to connect to the PBX 3, the maximum number of phones attempting to make an SSL connection, and the maximum number of phones attempting to register to the PBX.

The configuration parameters further include three unique multicast addresses associated with Groups 1, 2 and 3, respectively. Each IP phone 1 maintains three counter values, common to all of the IP phones 1, which keep track of the number of IP phones attempting to make connections for each of the three groups. For each group, the IP phones 1 are each responsible for counting the number of IP phones 1 attempting connections and for decrementing the count appropriately, via multicast messages, when the IP phones 1 are no longer attempting connections.

When an IP phone 1 attempts to make a connection, the IP phone sends an announcement over the subnet 5 using the multicast address that is associated with the group to which the IP phone is attempting a connection. Other IP phones receive this announcement and increment their respective counters associated with that group accordingly. When the IP phone 1 is finished attempting the connection, regardless of whether the IP phone 1 was successful or not, the IP phone 1 sends an announcement over the subnet using the same multicast address to indicate that the connection attempt is finished. The other IP phones 1 then decrement their counters following receipt of the announcement.

Three unique message types are defined as follows. The Group 1 TCP connection Message includes message type (STARTING or FINISHED), PBX IP address, phone IP address and phone MAC address. The STARTING message type is sent when the IP phone 1 is about to attempt a TCP connection with the PBX 3. The FINISHED message type is sent when the IP phone's socket handler either succeeds or fails on the connection attempt. The Group 2 SSL connection Message includes message type (STARTING or FINISHED), PBX IP address, phone IP address and phone MAC address. The STARTING message type is sent when the IP phone 1 is about to attempt an SSL connection with the PBX 3. The FINISHED message type is sent when the IP phone's SSL handler either succeeds or fails on the connection attempts. The Group 3 Registration Message includes message type (STARTING or FINISHED), PBX IP address, phone IP address and phone MAC address. The STARTING message type is sent when the IP phone 1 is about to attempt a Registration Request with the PBX 3. The FINISHED message type is sent when the IP phone 1 receives a final configuration message from the PBX 3 confirming registration of the IP phone 1.

The IP phones 1 decrypt the multicast messages with a pre-shared key, which is stored in flash memory of each IP phone 1, and in response update their internal counts. If any of the message parameters is incorrect, the message is ignored. The pre-shared key is provided in each IP phone's flash memory either at the time of manufacture or during configuration, however, it will be appreciated by a person skilled in the art that any known method that provides security to the multicast messages may be used.

Figure 5:
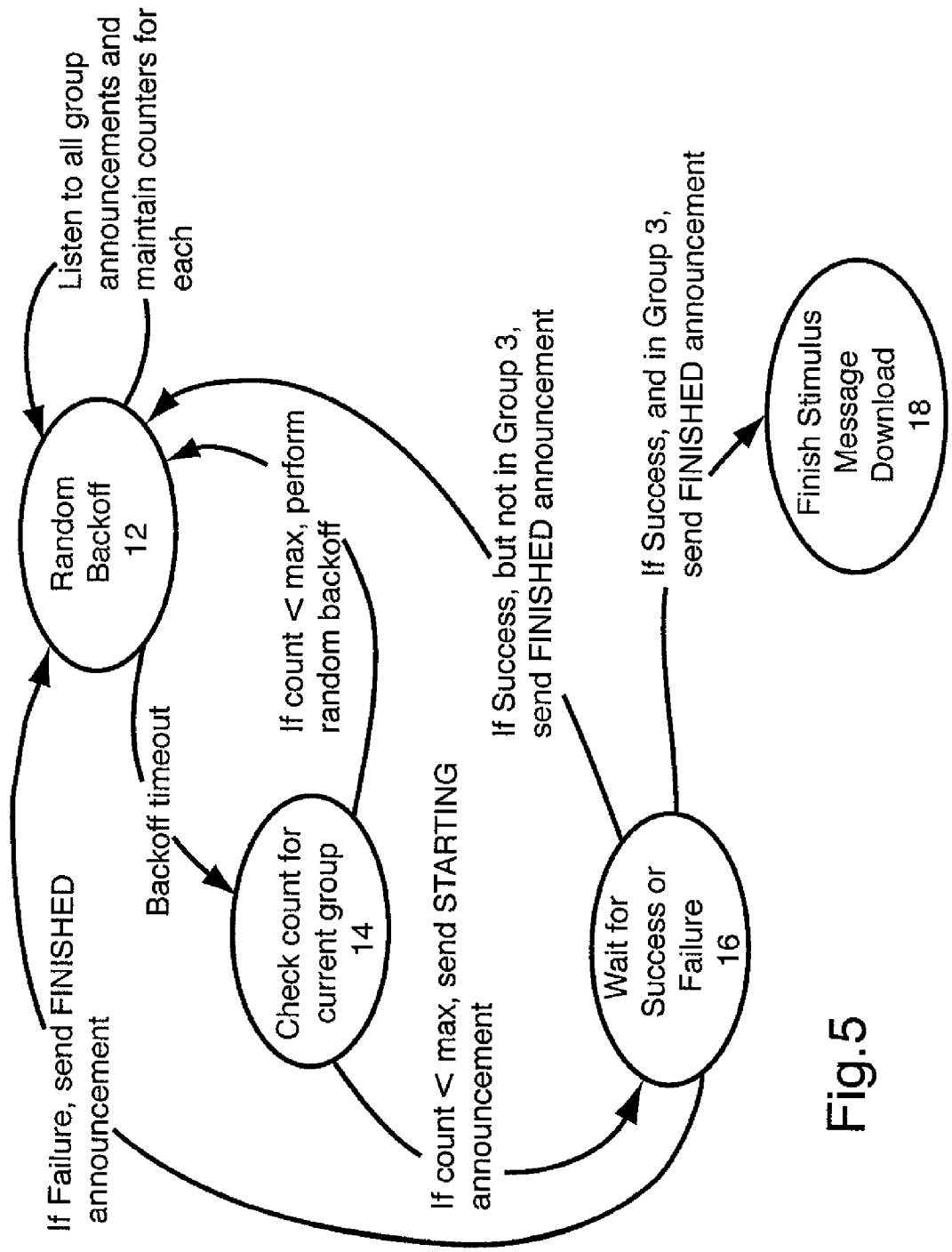
FIG. 5 is a state diagram showing operation of an IP phone according to an embodiment of the present invention.

Referring to FIG. 5, all IP phones 1 start at group 1 and perform a random backoff of between one and two seconds, with granularity of 10 ms. When in the random backoff state 12, the IP phones 1 listen to all announcements from other IP phones 1 and maintain counters for Group 1, Group 2 and Group 3. An IP phone 1 emerging from the random backoff state 12 enters the Check Count for Current Group State 14 and checks the counter of the desired group. If the count is equal to the maximum number (defined during configuration), the IP phone 1 returns to the random backoff state 12 for another random backoff of one to two seconds, with granularity of 10 ms. If, however, the count is less than the maximum number, the IP phone 1 will send a STARTING announcement using the multicast address associated with the desired group over the subnet 5.

Once the STARTING announcement has been sent, the IP phone 1 enters a Wait for Success or Failure State 16. If the connection is successful to either Group 1 or Group 2, the IP phone 1 sends a FINISHED announcement and re-enters the random backoff state 12. If the connection is successful to Group 3, the IP phone sends a FINISHED announcement and enters the Finish Stimulus Message Download State 18 in which the IP phone is operational and can make and receive calls, for example. If the connection to any of the three groups fails, the IP phone 1 sends a FINISHED announcement and re-enters the random backoff state 12.

It will be appreciated that once an IP phone 1 graduates from Group 1, it no longer listens to Group 1 multicasts but continues to listen to multicast messages from Groups 2 and 3. Similarly, once an IP phone 1 graduates from Group 2, it no longer listens to Group 2 multicasts but continues to listen to Group 3 multicast messages.

In some cases, secure connections are not supported by the PBX and are not desired. In these cases, the administrator may set the SSL limit equal to 0. The IP phones 1 interpret an SSL limit of 0 as an indication that there is no SSL stage.

If, for any reason, an IP phone detects that the current count for a Group is not changing for a predetermined period, for example, 40 seconds, the IP phone 1 sends a multicast message causing all IP phones 1 to flush their internal counter and assume a count of zero. The IP phones 1 will then backoff for another random time period, for example, between one and two seconds, with granularity of 10 ms, before entering the Check Count for Current Group State 14 again. IP phones 1 attempting a TCP connection preferably time out after 40 seconds if not successful and send a FINISHED announcement and re-enter the random backoff state 12. The time out period of 40 seconds is selected because SSL and Registration stages generally receive success or failure reports sooner than 40 seconds, however, it will be appreciated by person skilled in the art that another suitable time out period may be chosen.

Referring to FIG. 6, operation of IP phones "A" to "I" attempting to make a TCP connection, an SSL connection or a registration request, will now be described. FIG. 6 is a generic figure and therefore applies to connection attempts for each of Groups 1, 2 or 3. In this example, the maximum number of IP phones 1 for each group was set to five during configuration.

As shown, phone A is the first phone to emerge from the random backoff state 12. When phone A enters the Check Count for Current Group State 14, it discovers that the count is equal to zero, which is less than the maximum count of five, and therefore sends a STARTING announcement to the other phones. The count maintained by the phones then increments from zero to one. While phone A attempts connection, phones B, D, C and F also determine that the count is below the maximum, send out STARTING announcements and attempt connection.

When phone E emerges from the random backoff state 12 and enters the Check Count for Current Group State 14, it discovers that the count is equal to five and therefore phone E must enter the random backoff state 12 again, as shown. Phones A and B send FINISHED announcements once they have finished their connections.

Phone H emerges from the random backoff state 12 and enters the Check Count for Current Group State 14 following receipt of the FINISHED announcements from phones A and B. The advertised count is equal to three, which is less the maximum of five, therefore phone H sends a STARTING announcement and attempts connection. As shown, the count is now equal to four so that when phones D and C subsequently send their FINISHED announcements, the count is reduced in steps from four to three to two. Phone E is now able to send a STARTING announcement and attempt connection, thereby.

Phone F sends a FINISHED announcement once it has completed its connection attempt and the count decrements to two. Phones G and I then emerge from the random backoff state 12, send STARTING announcements and attempt connection. Once connection attempts have been completed, phones E, F, G and I send FINISHED announcements and the count becomes equal to zero.

The single random back off time period for Phone J is shown being greater than one, or two, random backoff time periods of the other phones. When phone J finally emerges from the random backoff state 12 for the first time, the count is equal to zero and therefore phone J is able to send a STARTING announcement and attempt connection. Once phone J has completed its connection attempt, the count once again is decremented to zero.

As shown in FIG. 6, none of the phones re-enter the random backoff state 12 following a connection attempt. As such, in this example, which may represent any of groups one, two or three, all of the connection attempts between the IP phones and PBX are successful.

In another embodiment, the IP phones notify their peers to perform specific actions. For example, the IP phones may have their messaging enhanced to include specific instructions for how many times to attempt a TCP connection to a specific port, or the IP phones may inform their peers to attempt to connect to a specific range of TCP ports. Further, the IP phones may inform one another to attempt to connect to a different PBX if they are unable to connect to a first PBX within a specific amount of time.

It will be appreciated by a person skilled in the art that the present invention is not limited to IP phones. Any IP device connecting to a central server may be used including computers, or other network devices, for example.

A specific embodiment of the present invention has been shown and described herein. However, modifications and variations may occur to those skilled in the art. All such modifications and variations are believed to be within the sphere and scope of the present invention.

What is claimed is:

1. A method for a plurality of IP devices in communication with a central server to connect to said central server, said method comprising:

one of said plurality of IP devices attempting to connect to said central server when a number of said IP devices attempting to connect to said central server is less than a maximum number;

said one of said of plurality of IP devices broadcasting a first message to others of said plurality of IP devices upon starting to attempt connection to said central server; and said one of said plurality of IP devices broadcasting a second message to others of said plurality of IP devices when finished attempting connection to said central server;

wherein each of said IP devices increments said number of said IP devices attempting to connect upon receipt of said first message and decrements said number of said IP devices attempting to connect upon receipt of said second message.

2. A method as claimed in claim 1, wherein said plurality of IP devices connect to said central server using a three stage registration process.

3. A method as claimed in claim 2, wherein each of said IP devices simultaneously maintains said number of said IP devices attempting to connect to said central server for each one of three stages of said three stage registration process.

4. A method as claimed in claim 3, wherein said maximum number is the same for each of said three stages.

5. A method as claimed in claim 1, wherein said IP devices are IP phones.

6. A method as claimed in claim 4, wherein said three stages are (i) TCP connection to a said central server, (ii) secure connection to said central server and (iii) registration with said central server.

7. A method as claimed in claim 1, wherein prior to attempting to connect to said central server, said one of said plurality of IP devices is in a backoff state.

8. A method as claimed in claim 1, wherein said one of said plurality of IP devices enters a wait for success or failure state upon starting to attempt connection to said central server.

9. A client/server network comprising:

a plurality of IP devices in communication with a central server and one another, each of said plurality of IP devices broadcasting a first message to others of said plurality of IP devices upon starting to attempt connection to said central server, broadcasting a second message to said others of said plurality of IP devices when finished attempting connection to said central server, and maintaining a count of a number of said IP devices attempting to connect to said central server at one time;

wherein each of said plurality of IP devices verifies that said count does not exceed a maximum count prior to attempting connection to said central server; and wherein each of said IP devices increment said count of said number of said IP devices attempting to connect upon receipt of said first message and decrements said count of said number of said IP devices attempting to connect upon receipt of said second message.

10. A client/server network as claimed in claim 9, wherein said IP devices are IP phones.

11. A client/server network as claimed in claim 9, wherein each of said plurality of IP devices is in a backoff state prior to attempting connection to said central server.

12. A client/server network as claimed in claim 9, wherein when attempting connection to said central server, each of said plurality of IP devices is in a wait for success or failure state.

* * * * *